United States Patent

Scott

[11] 3,871,771
[45] Mar. 18, 1975

[54] OPTICAL APPARATUS FOR DETERMINING DEVIATIONS FROM A PREDETERMINED FORM OF A SURFACE

[76] Inventor: Richard Nelson Scott, Skeets Farm, Flanchford Rd., Leigh near Reigate, England

[22] Filed: June 8, 1973

[21] Appl. No.: 368,319

[30] Foreign Application Priority Data
June 9, 1972  Great Britain.................. 26942/72
Apr. 18, 1973  Great Britain.................. 18718/73

[52] U.S. Cl.................. 356/114, 356/120, 356/138
[51] Int. Cl. .......................................... G01b 11/30
[58] Field of Search ........ 73/71.3; 353/20; 356/114, 356/117, 120, 156, 167, 241, 88, 93, 95, 206, 138; 350/159, 169, 150, 151; 324/140 D, 140 R

[56] References Cited
UNITED STATES PATENTS
1,978,434  10/1934  Maris................................ 356/115
3,196,739  7/1965  Wenking et al.................... 356/117
3,612,689  10/1971  Liskowitz........................... 356/114

OTHER PUBLICATIONS
Jenkins et al., Fundamentals of Optics, McGraw-Hill Book Company, Inc., Third Edition, 1957, page 504.

Primary Examiner—Ronald L. Wibert
Assistant Examiner—Richard A. Rosenberger
Attorney, Agent, or Firm—Brisebois & Kruger

[57] ABSTRACT

A surface of which deviations from a predetermined form, defined by a laser beam, are to be determined is followed by a sensing means including an optical element disposed in the laser beam, so that the plane of polarisation of the laser beam rotates in accordance with any sensed deviation. If the deviation to be sensed is twist of the surface about the beam, the optical element may be a sheet of Polaroid. If lateral displacements of the surface are to be measured the optical element may be a quartz wedge intersecting the laser beam. The variably polarised light beam is incident on a splitter (Wollaston prism) yielding mutually perpendicularly polarised components which are applied to respective photo-elements yielding respective signals which are fed to a sum and to a difference amplifier. A further amplifier provides a signal denotive of the ratio of the difference to the sum and representative of the measured deviation. The optical path may be folded and the beam may pass twice through the same or through different optical elements of the sensing means.

10 Claims, 12 Drawing Figures

3,871,771

OPTICAL APPARATUS FOR DETERMINING DEVIATIONS FROM A PREDETERMINED FORM OF A SURFACE

BACKGROUND OF THE INVENTION

1. Field of the Invention

This invention relates to optical apparatus for determining deviations of a surface from a predetermined form determined with respect to an axis defined by a laser beam.

2. Description of the Prior Art

Apparatus for distance measurement is well known in which a laser beam is reflected from an object of which the distance from the beam source is to be determined, the reflected beam being caused to interfere with the original beam and the distance being determined by interferometric methods involving the separation of the combined beam into mutually perpendicularly polarised components. It is also known to employ a laser beam for optical alignment of objects. The prior art systems and methods have not permitted measurement of deviations of a surface from a form predetermined with reference to an axis defined by a laser beam.

It is an object of the invention to provide optical apparatus by which deviation of a surface from a predetermined form defined in relation to a laser beam may be determined by following the surface with a sensing member influcing an optical element disposed in the laser beam and causing its plane of polarisation to be varied in accordance with the sensed deviation.

It is a further object of the invention to provide optical apparatus in which a polarised laser beam is directed through a quartz wedge displaced transversely of the beam in accordance with deviations of a surface from parallelism with the beam axis, and in which the rotation of the plane of polarisation is sensed to obtain a measure of the deviation.

It is another object of the invention to provide optical apparatus in which a laser beam is directed upon a polarising means rotated about the beam in accordance with deviations of a surface from a predetermined angle about the beam, and in which the rotation of the plane of polarisation is sensed to obtain a measure of the angular deviations of the surface.

SUMMARY OF THE INVENTION

An embodiment of the invention provides optical apparatus for determining deviations from a predetermined form of a surface, comprising a laser light source from which a beam of light is projected to establish a predetermined axis. A travelling sensing means is arranged for movement with an optical member thereof traversed by said light beam, said optical member producing a rotation of the plane of polarisation of the light beam which is representative of the deviation to be measured. A detector means receiving the light beam from said sensor means includes splitter means for dividing the received light beam into two components having mutually perpendicular planes of polarisation, two photoelectric elements each responsive to one of the component beams to yield a respective output signal representative of the magnitude of that component, and circuit means for combining said output signals thereby to obtain an indication or voltage representative of the measured deviation.

BRIEF DESCRIPTION OF THE DRAWINGS

Preferred features and advantages of the invention will become apparent from the following description, taken in conjunction with the drawings, of which:

In FIG. 1, a laser light source 1 projects a narrow beam of light 2 in a direction such as to define an axis with respect to which deviations of an object or surface are to be measured. The light beam passes through an optical member 31 forming a part of a sensing assembly 3, which is arranged to produce in response to the deviation to be measured a displacement of member 31 such as to give rise to a change in the direction of polarisation of the light beam which leaves assembly 3 to become incident upon a detector assembly 4, details of which will be explained later. In the present embodiment, member 31 is itself a polariser, conveniently consisting of a thin film array of polarising crystals, known under the Trade Mark "Polaroid." The plane of polarisation of the light beam which has passed through the polariser is thus dependent of the orientation of the film in its own plane, and this in turn depends upon the angular position of the sensing assembly 3 about the optical axis, which in this embodiment may deviate from a datum value in a manner which requires to be measured.

Figure 1:
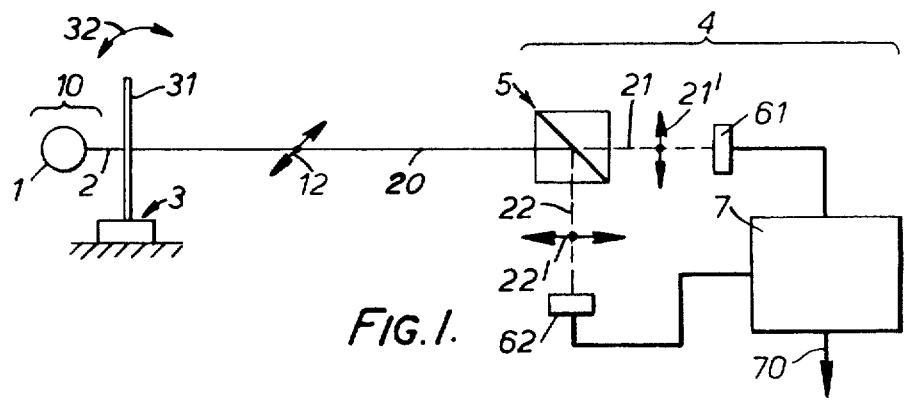
FIG. 1 is a schematic diagram illustrating one embodiment of apparatus according to the invention.

The detector assembly 4 contains a splitter means 5, consisting in this embodiment of a thin-film polarising beam splitter, by means of which the received beam 20 of variably polarised light is divided into two component beams 21, 22 which are polarised in mutually perpendicular planes. The component light beams 21, 22 fall upon respective photoelectric elements 61, 62 yielding respective output signals representative of the amplitude of the two components. The two output signals are combined in a circuit means 7 yielding at 70 a signal representative of the rotation from a predetermined datum of the plane of polarisation of the received light beam 20, and hence of the sensed deviation. The nature of the circuitry contained in circuit means 7 is explained below in relation to FIG. 3.

Figure 2:
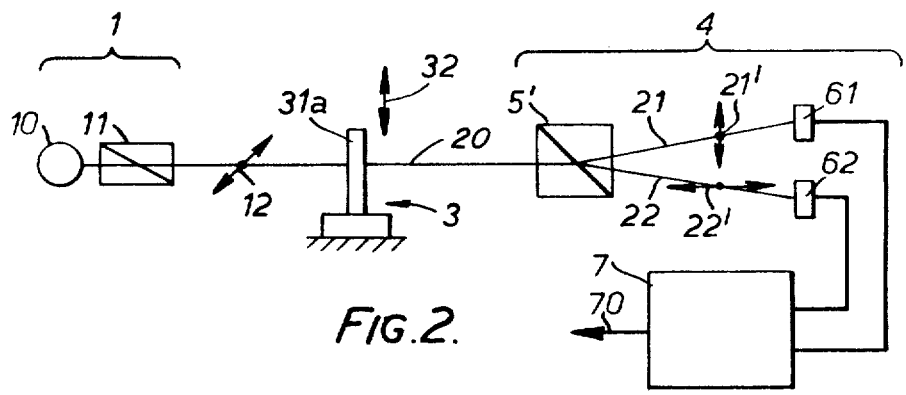
FIG. 2 is a schematic diagram illustrating one embodiment of apparatus according to the invention.

The arrangement shown in FIG. 2 differs from that of FIG. 1 in that the light beam projected from laser source 1 is itself polarised in a plane at 45° to the perpendicular planes of polarisation of the component beams 21, 22 of the detector assembly, which are separated from the received light beam 20 by the splitter means 5. To this end, source 1 includes, in addition to the actual light source 10, a polarising device 11, conveniently a known form of polarising prism. In this case sensing assembly 3 includes an optical element 31a which is arranged to be displaced transversely of the light beam as indicated by arrow 32 in response to the deviation of a member or surface from parallelism with the optical axis. Member 31a is a quartz wedge, preferably cemented to a mating optically matched glass prism, so that the only effect of the combination upon the polarised beam of light passing through it is a rotation of the plane of polarisation dependent upon the thickness of the portion of the wedge through which the beam passes.

In this embodiment the variably polarised light beam 20 is divided into mutually perpendicularly polarised component light beams by a Wollaston prism 5', the two components falling, as in FIG. 1, upon individual photoelectric elements 61, 62 of which the output signals are fed to a circuit means 7 again yielding at 70 a signal representative of the variation of the plane of polarisation from a predetermined datum and hence of the deviation.

In both the embodiments described the datum angle of the plane of polarisation of the received light beam 20 is conveniently at 45° to the planes of polarisation of the component light beams since, as is explained below in relation to FIG. 4, the output signals from photocells 61, 62 are equal when this condition obtains.

Figure 3:
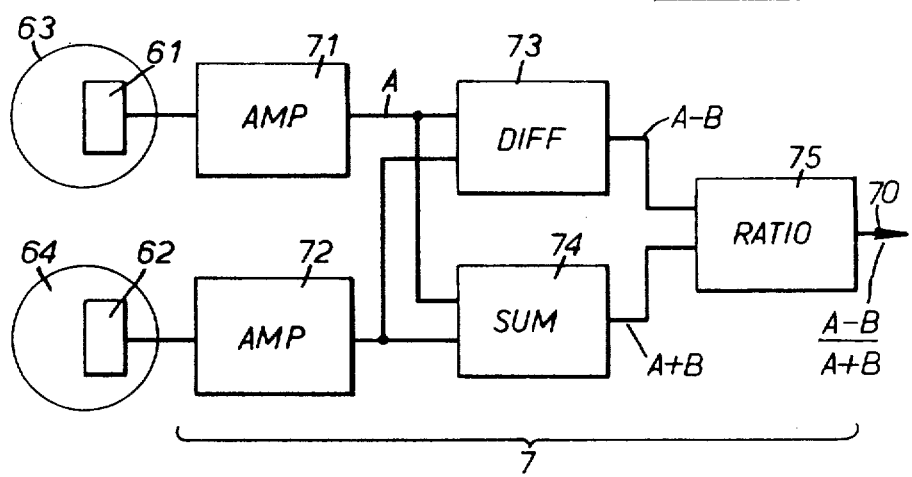
FIG. 3 is a block diagram illustrating an electronic detector system which may be used in carrying out the invention.

The circuitry contained within circuit means 7 is shown in FIG. 3. The signals from photocells 61 and 62 are applied to respective amplifiers 71, 72 which are adjusted to yield equal output signals when the photoelectric devices 61, 62 are equally illuminated. The output signals A and B from amplifiers 71, 72 are applied to respective inputs of both a difference amplifier 73 and of a sum amplifier 74. The outputs of amplifiers 73 and 74, representing (A − B) and (A + B) respectively, are applied to respective inputs of a ratio amplifier 75, at the output 70 of which there appears a signal representative of the ratio (A − B)/(A + B) of the two input signals applied to the amplifier. By taking the ratio of the two signals in this manner, the output signal obtained at 70, which is proportional to the difference between the intensities of the component beams 21, 22 is made independent of any fluctuations in the intensity of the light source 1. In order that alterations in the optical system which result in changing positions of the component beams 21, 22 shall not give rise to errors resulting from varying sensitivity of the photo electric elements over their areas, it may be found advantageous to place photoelectric elements 61, 62 in respective integrating spheres 63, 64, so that each receives wholly reflected light independent of the directions of the component beam entering the sphere. It is an advantage of the system described that since it is d.c. coupled throughout it has a very fast response time.

Figure 4:
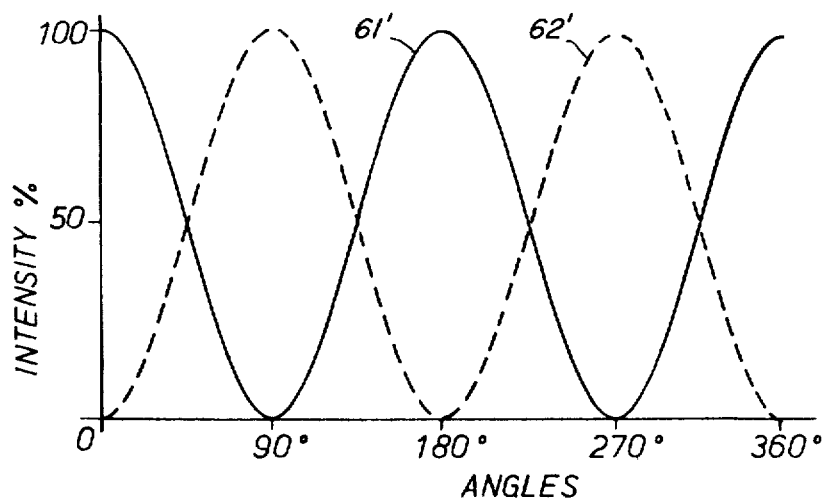
FIG. 4 illustrates a modification of an embodiment of the invention.

FIG. 4 shows the effect upon the intensity of the light received by the photoelectric elements 61, 62 of the varying angle between the plane of polarisation of the received light beam 20 and the planes of polarisation of the analysing device 5 through which the component beams are transmitted to the two photoelectric elements. The full line curve 61' represents the intensity of light falling upon photoelement 61 while the broken line curve 62' represents the intensity of the light falling upon photoelectric element 62 as dependent upon the angle between the plane of polarisation of the incident light beam and the non-transmission plane of the analyser 5. It will be seen that, ignoring reflections and other minor losses, the two photoelectric elements receive equal quantities of light when the plane of polarisation of the received light beam is at 45° or some multiple thereof to the non-transmission plane of the analyser. It is therefore usually most advantageous, when both positive and negative deviations from a datum are to be measured, to arrange that zero deviation results in the plane of the transmitted light beam being at 45° to the null plane of the analyser, so that the two photoelectric elements 61, 62 receive equal intensities of illumination.

The form of the curves 61', 62' is that of a sine-squared function, which is rectilinear to within 1 percent over a range of variation of ± 7° from the 45° position and to within 2 percent over a range of ± 10°. The ratio amplifier therefore yields at 70 an output signal which is proportional to within the stated tolerances to the variation of the angle of the plane of polarisation from its datum position, and hence to the deviation causing the rotation. This signal may be applied as desired, either to provide a direct indication of the measured deviation by applying the signal to an indicating meter, to prepare a record of the measurement by applying the signal to a chart recorder or to produce some required controlling effect.

Figure 5:
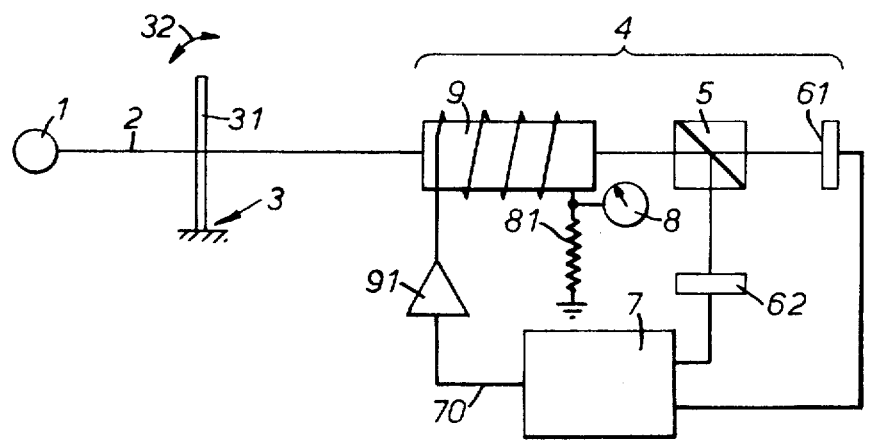
FIG. 5 is a graph used to explain the operation of apparatus in accordance with the invention.

FIG. 5 illustrates one application of the invention to measuring twist of an object with reference to a predetermined direction. A laser light source 1 directs a beam of light 2 through a polarising element 31 forming part of a sensing device 3 attached to the object of which the twist is to be measured. The polarised light beam passes through a Faraday modulator 9 to a polarising beam splitter 5 yielding perpendicularly polarised component beams which fall upon respective photoelectric elements 61 and 62. The output signals from elements 61 and 62 pass to circuit means 7 yielding at 70 an output signal which is applied by way of an amplifier 91 to the energizing coil of the Faraday cell 9, which is thus controlled to nullify the rotation of the plane of polarisation of the incident light. With an uncooled Faraday cell 9 the range of measurement is ± 2° and the system may be very accurate within this range. To measure larger deviations a water-cooled Faraday cell may be driven by a 50-watt amplifier to provide a measurement range of ± 10°. The current fed to the Faraday cell passes through a resistor 81, the voltage appearing across which is measured by an indicating meter 8 to provide an indication of the measured twist.

Figure 6:
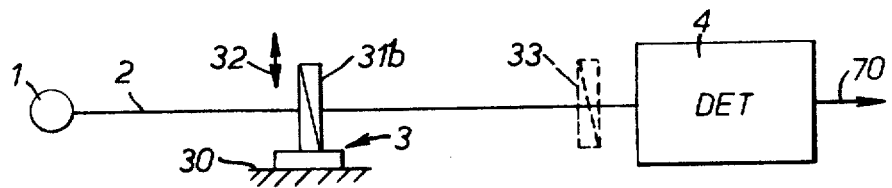
FIG. 6 is a schematic diagram illustrating one mode of measuring lateral deviation of a surface in accordance with the invention.

FIG. 6 illustrates the use of apparatus in accordance with the invention by means of which lateral deviation of an object from a predetermined rectilinear path may be measured. This application of the invention may be used to determine deviation of the ways of a machine tool from exact rectilinearity.

A laser light source 1 projects a beam of 2 polarised light along a path through a displacement-sensitive polarising element 31b to a detector 4 which is identical in construction and operation with the detector apparatus 4 of FIG. 1. Element 31b may be a compensated quartz wedge producing for example, increasing left-handed rotation of the transmitted light as it as traversed across the optical path. If element 31b forms a part of a sensing means 3, traversed along a surface 30 which is intended to be flat and parallel with light beam 2, then detector 4 will yield at 70 a signal representative of any deviation of the surface from its required form. It is advantageous, though not essential, for the optical path to include a second compensated quartz wedge 33, producing in this case right-handed rotation of the plane of polarisation of transmitted light. This second wedge is adjusted so that the rotation produced by the first wedge 31b is compensated when the surface 30 is at the intended distance from the line defined by light beam 2. Positive and negative deviations from this intended distance will then be represented by appropriately varying signals at 70.

Figure 7:
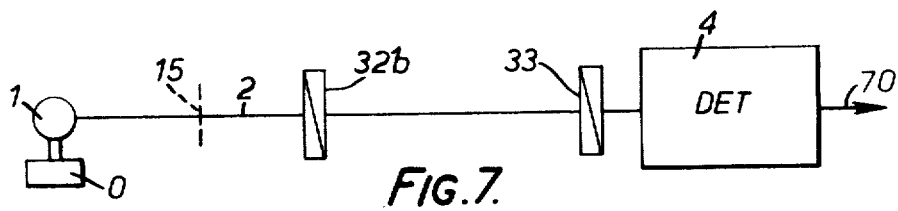
FIG. 7 is a schematic diagram illustrating deviation transversely of the light beam of a surface along which the sensing means, or a portion thereof is traversed. In the present case member 31 is another mode of carrying and the measurement described in relation to FIG. 6.

FIG. 7 illustrates apparatus in accordance with the invention applied to the measurement of deviation of the light beam. A laser light source 1 provides a beam 2 of polarised light which is directed upon a detector means 4 of the kind already described by way of left-hand and right-hand quartz wedges 31b, 33, both fixed in relation to to the detector. Any deviation of beam 2 from its initial direction, as a result of movement of an object O upon which source 1 is mounted, or as a result of the movement of an optical element 15 introduced into the light path will result in a corresponding variation of the output signal provided by the detector at 70. If this signal is applied to a chart recorder the system provides a high precision recording autocollimator.

Figure 8:
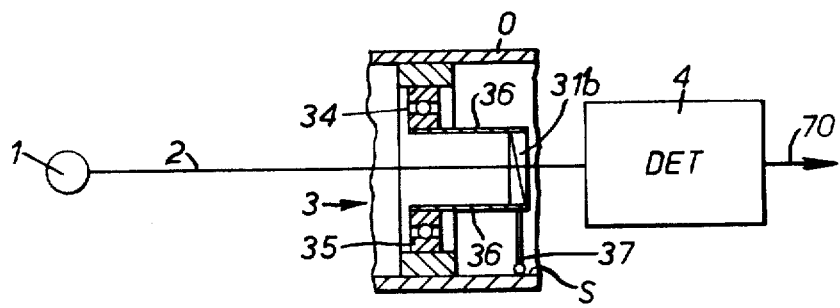
FIG. 8 is a schematic diagram illustrating a manner of measuring circularity of the bore of a hollow object.

FIG. 8 illustrates the application of the invention to measurement of the eccentricity of the bore of a hollow cylinder. A laser light source 1 directs a beam of polarised light 2 along the intended bore axis of a hollow object O. A sensing means 3 consists in this case of a tubular member 34 readily slidable along the bore to be tested. Member 34 carries a bearing 35, which need not be a precision bearing, upon which is mounted by means of leaf springs 36 a quartz wedge 31b. A probe 37 extends from wedge 31b and engages the bore surface S of object O, so that the position of wedge 31b transversely of the optical path is determined by the distance between the axis defined by that path and the bore surface. Light entering detector means 4 will therefore have a plane of polarisation which may be arranged to be zero when the surface S is concentric with the bore and to vary appropriately as the distance of the surface from the nominal axis is greater or less than the radius.

Figure 9:
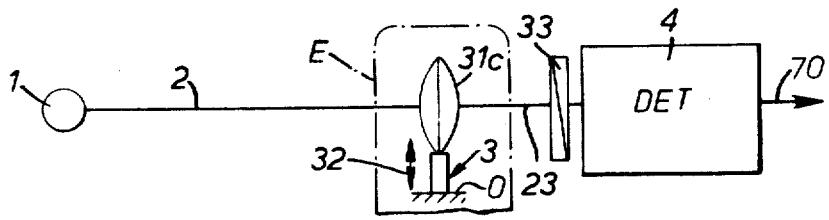
FIG. 9 is a schematic diagram illustrating a mode of measuring deviations from a mean position of an object in a hostile environment.

FIG. 9 illustrates another embodiment of apparatus in accordance with the invention which is applicable to the measurement of deviations within a hostile environment. A laser light source 1 projects a beam 2 of polarised light towards a detector means 4 already described. The beam passes through a lens 31c situated in a hostile environment of which the boundary is schematically denoted by chain-line E. Lens 31c, which is arranged to focus light source 1 upon detector means 4, is attached to a sensing means 3 carried upon a body O within the hostile environment, of which the deviation from a datum position is to be determined. Movement of lens O displaces the emergent beam 23 of polarised light over a quartz wedge 33 fixed with respect to the detector 4. The plane of polarisation of the light entering the detector is thus representative of the deviations of object O from a datum position and detector means 4 yields an output signal at 70 which is representative of this deviation.

It will be obvious that the apparatus of FIG. 9 is not necessarily used with the lens 31c in a hostile environment. This system also allows measurement of deviations of the object supporting the lens, whatever its situation, when it is desired to extend the range of movement in the direction of the light beam of the object of which the deviation is to be sensed.

Figure 10:
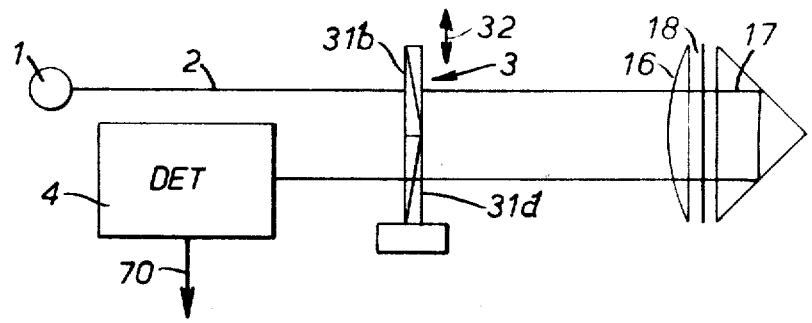
FIGS. 10, 11 and 12 illustrate different modes of measuring lateral deviations of an object from a line defined by a folded optical path.
Figure 11:
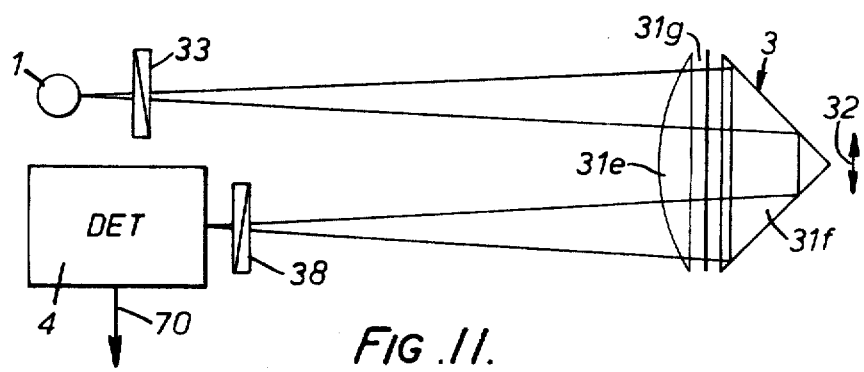
Figure 12:
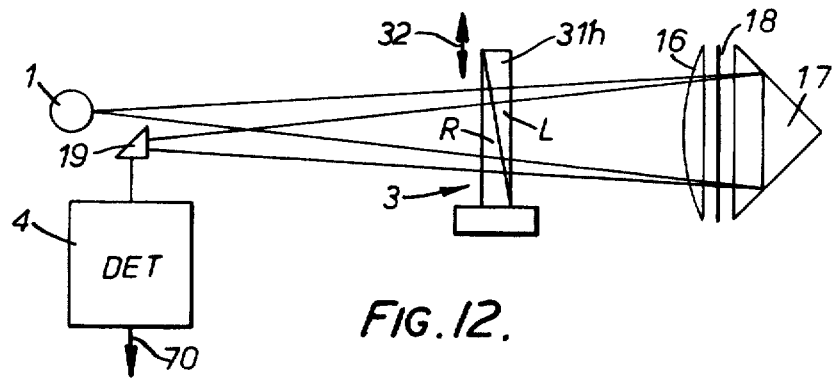

FIGS. 10, 11 and 12 illustrate embodiments of apparatus in accordance with the invention in which the optical path is folded by means of a retro-reflector of known type.

In FIG. 10 a beam 2 of polarised light is directed from a laser light source 1 upon a retro-reflector 17 faced with a lens 16 which focuses the light source upon a detector means 4. The focal length of the lens is so chosen that the laser and detector lie at principal foci of the lens and for this reason, using readily available lenses, the distance over which the system operates will usually be limited to 50 metres. The use of the lens ensures that at all positions of the sensing means 3 the size of the light beam passing through a left-hand quartz wedge 31b carried by the sensing means will be equal to that of the beam passing through a right-hand quartz wedge 31d also carried by the sensing means. A mica quarter-wave plate 18 is interposed between the lens 16 and the reflector 17 so that the effects upon the plane of polarisation of the light beam of passing through the two wedges are additive. After passing through wedge 31d the light enters a detector 4 of the kind already described, which yields at 70 a signal representative of the measured deviation of sensing means 3 from its datum position with respect to the light beam in the direction of double arrow 32.

FIG. 11 shows another embodiment of apparatus in accordance with the invention in which the retro-reflector forms a part of the deviation sensing means. Polarised light from a laser source 1 is directed through a left-hand quartz wedge 33 upon a sensing assembly 3 which in this case comprises a lens 31e, a reflecting prism 31f and a quarter-wave mica plate 31g. Light reflected by the sensing assembly 3 is directed upon a second, right-handed quartz wedge 38 and enters a detector 4 of the kind described in relation to FIG. 1. Any deviation of sensing assembly 3 from a predetermined position will vary the angle of polarisation of the beam received by detector 4, which will therefore yield at 70 a signal representative of the deviation to be measured, which is denoted by double arrow 32.

FIG. 12 shows another arrangement of apparatus in which a sensing means is movable in the direction of the optical path. Polarised light from a laser source 1 is directed through the optical element 31h of a sensing assembly 3 upon a retro-reflector assembly comprising, as in FIG. 10, a lens 16, prism 17 and quarter-wave plate 18. The returned light beam also passes through optical element 31h and is directed by a reflecting prism or other suitable reflector 19 into detector 4, which again is of the kind described in relation to FIG. 1. In this embodiment the optical element 31h comprises a double quartz wedge including a left-hand wedge L mated with a right-hand wedge R. Any deviation of sensing assembly 3 in the direction indicated by double arrow 32 will result in a corresponding signal at the output 70 of detector 4.

In each of the embodiments of FIGS. 10 – 12 the half-wave plate included in the reflector system may be replaced or supplemented by films applied to the reflective surfaces to produce appropriate phase changes, so that the reflected beam is changed in phase by 180° with respect to the incident beam.

I claim:

1. Optical apparatus for determining deviations from a predetermined form of a surface, comprising a laser light source means for projecting a beam of light from said source to establish a predetermined axis, a sensing means including an optical element traversed by said light beam, said sensing means arranged to travel with said optical element and including follower means producing displacement of said optical element in relation to said light beam in response to said deviation of said surface whereby said optical element produces a rotation of the plane of polarisation of said light beam which is representative of the measured deviation, and a detector means positioned to receive the light beam after traversing said optical element, said detector means including optical beam splitter means for dividing said light beam into two components having mutually perpendicular planes of polarisation, two photoelectric elements each responsive to one of the component beams to yield a respective output signal representative of the magnitude of that component, and circuit means for combining said output signals thereby to obtain a signal representative of the measured deviation.

2. Apparatus as claimed in claim 1 wherein said circuit means includes respective sum and difference amplifiers, each fed with signals proportional to the output signals of said photoelectric elements and yielding signals respectively representative of their sum and of their difference, and a ratio amplifier fed with said amplifier output signals and yielding a ratio signal representative of the difference amplifier output signal divided by the sum amplifier output signal, the amplitude of said ratio signal being representative of the measured deviation.

3. Apparatus as claimed in claim 2 wherein said difference signal is applied to an electro-optical cell positioned in the path of the light beam between the sensing means and the splitter means.

4. Apparatus as claimed in claim 2 wherein said ratio signal is applied to an electro-optical cell positioned in the path of the light beam between the sensing means and the splitter means.

5. Apparatus in accordance with claim 1 wherein said laser light source includes a polarising means whereby said light beam has a plane of polarisation and said sensing means includes a quartz wedge disposed in the path of said light beam and arranged for displacement in response to the deviation to be measured whereby a varying thickness of quartz is introduced into the optical path to produce a corresponding rotation of said plane of polarisation.

6. Apparatus as claimed in claim 5 wherein said wedge is carried by spring members from a rotary mounting and is provided with a probe arranged to bear against the inner surface of a hollow member through which said light beam is projected, whereby to obtain a measure of the eccentricity of said surface with reference to said light beam.

7. Apparatus as claimed in claim 1 wherein said optical element of the sensing means consists of a lens arranged to focus the light source upon the detector means.

8. Apparatus as claimed in claim 1 wherein said light beam passes from said light source to said detector means by way of a reflector.

9. Apparatus in accordance with claim 8 wherein the light reflected from said reflector is caused to be changed in phase by 180° and wherein said optical element of said sensing means includes two quartz wedges producing opposite changes in rotation in response to like deviations of the wedges transversely of the optical path.

10. Apparatus in accordance with claim 8 wherein said optical element of said sensing means is traversed both by light passing from the light source to the reflector and by light passing from the reflector to the detector means, said optical element comprising matched quartz wedges producing opposite rotations of the plane of polarisation of a transmitted light beam.

* * * * *